(12) United States Patent
Sone et al.

(10) Patent No.: US 11,421,327 B2
(45) Date of Patent: Aug. 23, 2022

(54) WATER ELECTROLYSIS METHOD AND WATER ELECTROLYSIS DEVICE

(71) Applicants: JAPAN AEROSPACE EXPLORATION AGENCY, Chofu (JP); Hitachi Zosen Corporation, Osaka (JP); W.L. Gore & Associates, Co., Ltd., Tokyo (JP)

(72) Inventors: Yoshitsugu Sone, Chofu (JP); Masato Sakurai, Chofu (JP); Naoki Sato, Chofu (JP); Hirohisa Umemoto, Chofu (JP); Tetsuya Yoshida, Osaka (JP); Wataru Ishida, Tokyo (JP); Hiroyoshi Fujimoto, Tokyo (JP)

(73) Assignees: JAPAN AEROSPACE EXPLORATION AGENCY, Chofu (JP); HITACHI ZOSEN CORPORATION, Osaka (JP); W.L. GORE & ASSOCIATES G.K., Tokyo (JP)

( * ) Notice: Subject to any disclaimer, the term of this patent is extended or adjusted under 35 U.S.C. 154(b) by 237 days.

(21) Appl. No.: 15/129,185

(22) PCT Filed: Mar. 26, 2015

(86) PCT No.: PCT/JP2015/059322
§ 371 (c)(1),
(2) Date: Sep. 26, 2016

(87) PCT Pub. No.: WO2015/147142
PCT Pub. Date: Oct. 1, 2015

(65) Prior Publication Data
US 2017/0101717 A1    Apr. 13, 2017

(30) Foreign Application Priority Data

Mar. 26, 2014 (JP) .............................. JP2014-064464

(51) Int. Cl.
*C25B 1/04* (2021.01)
*C25B 13/08* (2006.01)
(Continued)

(52) U.S. Cl.
CPC .................. *C25B 1/04* (2013.01); *C25B 9/23* (2021.01); *C25B 9/73* (2021.01); *C25B 13/08* (2013.01);
(Continued)

(58) Field of Classification Search
None
See application file for complete search history.

(56) References Cited

U.S. PATENT DOCUMENTS 4,218,542 A    8/1980  Ukihashi et al.
4,329,435 A *  5/1982  Kimoto ............ C08F 216/1466
                                            521/38
(Continued)

FOREIGN PATENT DOCUMENTS

EP    0 094 679 A2    11/1983
JP    53-149881 A     12/1978
(Continued)

OTHER PUBLICATIONS

Sone et al. "Water electrolysis to Produce the Dry Oxygen for the Human Activies under the Closed Environment" ECS Meeting Abstracts, 2012 (Year: 2012).*
(Continued)

*Primary Examiner* — Stefanie S Wittenberg
(74) *Attorney, Agent, or Firm* — WHDA, LLP

(57) ABSTRACT

Provided are a water electrolysis method and a water electrolysis device in which mixing of the generated hydrogen and oxygen is greatly reduced and which have a high electrolysis efficiency, while being simplified in structure. In the water electrolysis method and water electrolysis device,
(Continued)

water is electrolyzed by supplying water to the cathode side of an electrolytic membrane including a solid polymer membrane provided with a catalyst layer on a surface thereof and creating a potential difference between both surfaces of the electrolytic membrane. The temperature-controlled water is supplied only to the cathode side of the electrolytic membrane, while controlling the difference in pressure between both surfaces of the electrolytic membrane to 50 kPa or less.

4 Claims, 1 Drawing Sheet

(51) Int. Cl.
    *C25B 15/02*     (2021.01)
    *C25B 9/73*     (2021.01)
    *C25B 9/23*     (2021.01)
    *C25B 15/08*     (2006.01)
    *H01M 8/18*     (2006.01)

(52) U.S. Cl.
    CPC .............. *C25B 15/02* (2013.01); *C25B 15/08* (2013.01); *H01M 8/186* (2013.01); *Y02E 60/36* (2013.01)

(56) References Cited

U.S. PATENT DOCUMENTS

| | | | |
|---|---|---|---|
| 4,384,941 A * | 5/1983 | Okamoto | .............. C08F 255/02 204/296 |
| 5,203,972 A | 4/1993 | Shimamune et al. | |
| 5,350,496 A | 9/1994 | Smith et al. | |
| 2002/0051898 A1* | 5/2002 | Moulthrop, Jr. | .. H01M 8/04164 429/418 |
| 2008/0264780 A1* | 10/2008 | Kato | .......................... C25B 1/04 204/252 |
| 2010/0288647 A1* | 11/2010 | Highgate | .................. C25B 9/73 205/628 |
| 2011/0198232 A1 | 8/2011 | Cipollini et al. | |
| 2013/0284591 A1 | 10/2013 | Delahaye et al. | |

FOREIGN PATENT DOCUMENTS

| | | | | |
|---|---|---|---|---|
| JP | 55-139842 A | 11/1980 | | |
| JP | 55-141580 A | 11/1980 | | |
| JP | 58-37186 A | 3/1983 | | |
| JP | 63-61337 B2 | 11/1988 | | |
| JP | H02129389 | * | 5/1990 | ................ C25B 1/04 |
| JP | 4-191387 A | 7/1992 | | |
| JP | 9-67689 A | 3/1997 | | |
| JP | 10-251884 A | 9/1998 | | |
| JP | 2003-138391 A | 5/2003 | | |
| JP | 2011-162880 A | 8/2011 | | |
| JP | 2014-503689 A | 2/2014 | | |

OTHER PUBLICATIONS

International Search Report dated Jun. 30, 2015, issued in counterpart International Application No. PCT/ JP2015/059322 (2 pages).

* cited by examiner

WATER ELECTROLYSIS METHOD AND WATER ELECTROLYSIS DEVICE

TECHNICAL FIELD

The present invention relates to a water electrolysis method and water electrolysis device in which water is supplied to the cathode side of an electrolytic membrane including a solid polymer membrane provided with a catalyst layer on a surface thereof, and water is electrolyzed by allowing an electric current to flow between both surfaces of the electrolytic membrane.

BACKGROUND ART

Oxygen required for human respiration in a spacecraft or space station, etc. can be created by electrolysis of water.

An example is generally known in which electrolysis of water is performed with an electrolysis device using a solid polymer membrane, wherein water is supplied only to an electrode where oxygen is generated (anode) or to both an electrode where hydrogen is generated (cathode) and the electrode where oxygen is generated (anode).

Water is supplied because a membrane which is typically used as a solid polymer membrane has hydrogen ion conductivity, and the electrolysis is accompanied by a phenomenon of an electrochemical osmotic pressure being generated from an anode towards a cathode and thus moving water from the anode side to the cathode side, and therefore in cases where water is not supplied at least to the anode side, the membrane dries as the electrolysis progresses.

However, when oxygen is used for human respiration in a space station, etc., this oxygen needs to be dry. This is partly because wet oxygen is unsuitable for respiration, and also because providing a wet gas in a closed environment may create condensations, which in turn leads to malfunction of electronic devices.

This being the case, a method for delivering dry oxygen is needed, and in order to ensure safety, it is necessary to minimize the admixture of hydrogen generated at a counter electrode into oxygen through the membrane.

Methods and devices for obtaining hydrogen and oxygen by electrolyzing water have been advanced widely in the field of industrial technology, and various configurations thereof corresponding to the intended use of the generated hydrogen or oxygen are known.

As one example, technology for obtaining oxygen and hydrogen by electrolyzing liquid-state water or electrolytic solution by bringing it into contact with a cathode and an anode is well known, as disclosed in PTL 1, for example.

With this well-known water electrolysis method and water electrolysis device, both hydrogen and oxygen are generated as bubbles in the liquid, and a gas-liquid separator is needed so that they could be used in a gaseous state, making the device complex. In a zero-gravity state such as in a space station, in particular, a special device is needed so as to subject the bubbles in the liquid to separation, which unfavorably results in even greater complexity of the device and cost rise.

Further, a large amount of hydrogen is admixed to the generated oxygen and a large amount of oxygen is admixed to hydrogen, so measures need to be taken for both to prevent ignition and explosion, and this also leads to unfavorable cost rise of the entire device.

It is also well known, as disclosed in PTL 2, etc., that supplying water only to the cathode side of an electrolytic membrane (bilayer membrane 20) provided with a catalyst layer on the surface thereof and electrolyzing water by creating a potential difference between both surfaces of the electrolytic membrane eliminates the need for gas-water separation for oxygen generated on the anode side.

CITATION LIST

Patent Literature

[PTL 1] Japanese Patent Application Publication No. H9-67689

[PTL 2] Japanese Patent Application Publication No. 2011-162880

SUMMARY OF INVENTION

Technical Problem

However, with the well-known technique disclosed in the aforementioned PTL 2, although purity of oxygen generated at the anode side of the electrolytic membrane (bilayer membrane 20) can be increased, a pressure on the anode side is set significantly higher than on the cathode side of the electrolytic membrane (bilayer membrane 20) in order to achieve this increase in purity.

This being the case, the electrolytic membrane (bilayer membrane 20) needs to be increased in thickness in order to prevent damage on the electrolytic membrane (bilayer membrane 20) caused by such a difference in pressure and reduce the admixture of oxygen generated on the anode side to the cathode side.

Problems arising when the electrolytic membrane (bilayer membrane 20) is made thicker are that power necessary for electrolysis also increases, the electrolysis efficiency in relation to the consumed power is degraded, and power supply equipment also becomes costly.

Another problem is that since the pressure on the anode side of the electrolytic membrane (bilayer membrane 20) is significantly higher than on the cathode side, a large amount of oxygen is still admixed to hydrogen generated on the cathode side, so measures need to be taken to prevent ignition and explosion, leading to cost rise of the entire device.

Under these circumstances, it is an objective of the present invention to resolve the problems inherent to the well-known water electrolysis methods and water electrolysis devices, such as described hereinabove, i.e. to provide a water electrolysis method and a water electrolysis device in which mixing of the generated hydrogen and oxygen is greatly reduced and which have a high electrolysis efficiency, while being simplified in structure.

Solution to Problem

The present invention resolves the aforementioned problems by providing a water electrolysis method in which water is electrolyzed by allowing an electric current to flow between both surfaces of an electrolytic membrane including a solid polymer membrane provided with a catalyst layer on a surface thereof, wherein temperature-controlled water is supplied only to a cathode side of the electrolytic membrane, while controlling a difference in pressure between both surfaces of the electrolytic membrane to 50 kPa or less.

The present invention also resolves the aforementioned problems by providing a water electrolysis device having an electrolytic membrane including a solid polymer membrane provided with a catalyst layer on a surface thereof; a housing having spaces defined by the electrolytic membrane; power supply unit for allowing an electric current to flow between both surfaces of the electrolytic membrane; water supply unit for supplying water to a cathode side of the electrolytic membrane; and pressure control unit for controlling a pressure in both the spaces in the housing defined by the electrolytic membrane, wherein the water supply unit has a water temperature control device that controls the temperature of water supplied to the cathode side of the electrolytic membrane, and a difference in pressure between both the spaces in the housing defined by the electrolytic membrane is made 50 kPa or less by the pressure control unit.

Advantageous Effects of Invention

In a water electrolysis method according to embodiments of the present disclosure, by controlling the temperature of water supplied to the cathode side, it is possible to optimize the diffusion of water to the surface of the electrolytic membrane and to obtain a wet shield effect in the vicinity of the hydrogen-generating electrode with the membrane through which water has sufficiently diffused.

As a result, oxygen generated on the anode side and hydrogen generated on the cathode side can be further prevented from passing through inside the electrolytic membrane. Therefore, the admixture of hydrogen to the generated oxygen and the admixture of oxygen to hydrogen can be suppressed, while reducing the electrolytic membrane in thickness.

Further, by setting the difference in pressure between both surfaces of the electrolytic membrane to 50 kPa or less, it is possible to prevent the electrolytic membrane from damage caused by the difference in pressure, while reducing the electrolytic membrane in thickness, and also to suppress the movement of oxygen and hydrogen in the membrane caused by the difference in pressure.

In a water electrolysis method according to embodiments of the present disclosure, the electrolytic membrane is subjected to internal strength reinforcement with an organic polymer or an inorganic substance with a low gas permeability. As a result, the passage of oxygen generated on the anode side and hydrogen generated on the cathode side can be prevented by the organic polymer or inorganic substance used for the reinforcement. Further, as a result of reducing the thickness of the organic polymer or inorganic substance used for the reinforcement, practically no effect is produced on the movement of ions. Therefore, the admixture of hydrogen to the generated oxygen and the admixture of oxygen to hydrogen can be suppressed, while reducing the electrolytic membrane in thickness.

Further, power needed for the electrolysis can be reduced and the electrolysis efficiency in relation to the consumed power is increased due to the decrease of the electrolytic membrane in thickness.

In addition, since the organic polymer or inorganic substance used for the reinforcement have strength, damage caused by the difference in pressure can be prevented despite the reduction in the electrolytic membrane thickness.

Further, since the admixture of hydrogen to oxygen and the admixture of oxygen to hydrogen can be suppressed, damage caused by the difference in pressure can be prevented, and the electrolysis efficiency in relation to the consumed power can be increased, the device and structure needed for implementing such measures can be simplified, and the structure can be simplified.

Since the organic polymer or inorganic substance used for the reinforcement are insulators and, therefore, not affected by any force from the applied electric field, the electrolytic membrane can be prevented from damage and deterioration.

Further, as a result of using the organic polymer or inorganic substance for the reinforcement, it is possible to use a thin film, while maintaining the strength thereof, and reduce the electric resistance in the electrolysis. Therefore, water electrolysis can be implemented at a low temperature. The usual water electrolysis is implemented at a high temperature of about 80° C., but where water electrolysis is performed in high-temperature range, water vapor is generated and the amount of water vapor admixed to the oxygen gas is increased. By contrast, since it is possible to maintain a low operation temperature, the amount of water admixed to the generated oxygen can be suppressed.

It is desirable that the operation be performed within a range from room temperature to about 60° C. since condensation of the gas which is to be discharged can be prevented.

The present disclosure also makes it possible to ensure a small thickness, a high strength, and insulating properties, and perform efficient electrolysis without affecting the movement of ions.

In embodiments of the present disclosure, by controlling the temperature of water supplied to the cathode side of the electrolytic membrane within a range of room temperature to 60° C., it is possible to control the amount of generated water vapor and control the water temperature in an easy manner in a practical range.

The present disclosure also makes it possible to suppress sufficiently the admixture of hydrogen to oxygen and the admixture of oxygen to hydrogen in an electrolytic membrane that is significantly thinner than the conventional membranes. At the same time, it is possible to prevent damage caused by the difference in pressure, further increase the electrolysis efficiency in relation to the consumed power, and simplify the device and structure.

In a water electrolysis device according to embodiments of the present disclosure, it is possible to control efficiently the temperature of water supplied to the cathode side, without providing a complex mechanism.

In a water electrolysis device according to embodiments of the present disclosure, water supplied to the cathode side can be supplied under optimum conditions and in an optimum amount.

REFERENCE SIGNS LIST

Figure 1:
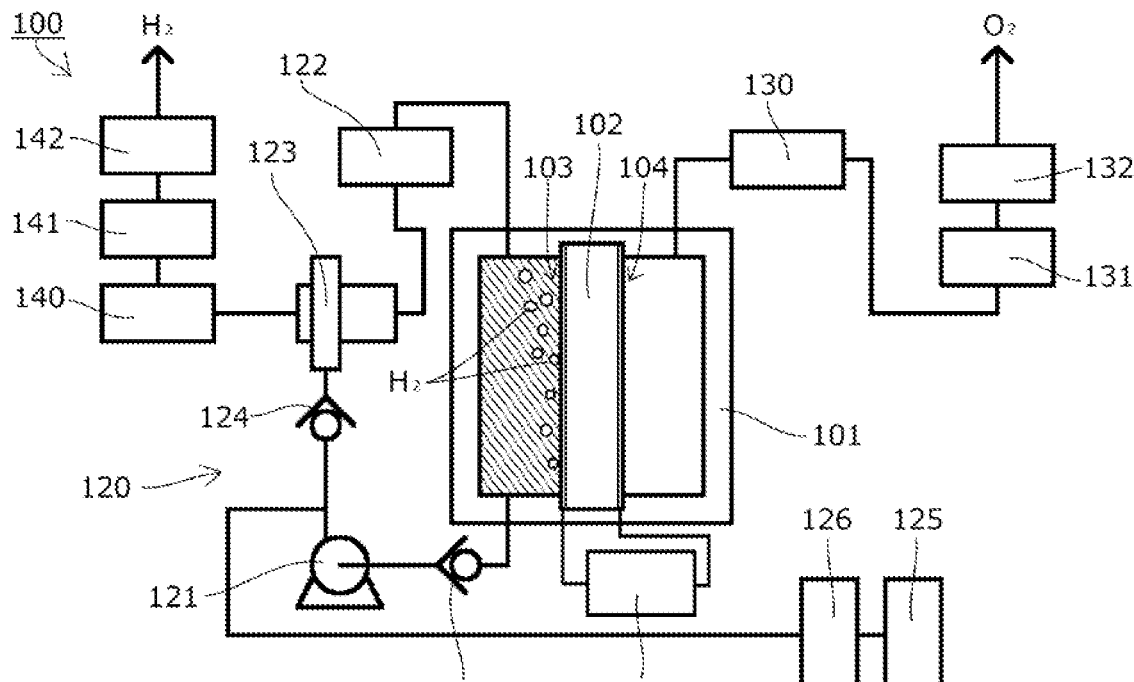
FIG. 1 is an explanatory drawing of a water electrolysis device according to an embodiment of the present invention.

100 Electrolysis device
101 Housing
102 Electrolytic membrane
103 Cathode side
104 Anode side
110 Power supply unit
120 Water supply unit
121 Pump
122 Heat exchanger (water temperature control device)
123 Gas-water separator
124 Check valve
125 Water tank 126 Ion exchange membrane
130 Pressure control unit (oxygen side)
131 Flowmeter (oxygen side)
132 Hygrometer (oxygen side)
140 Pressure control unit (hydrogen side)
141 Flowmeter (hydrogen side)
142 Hygrometer (hydrogen side)

DESCRIPTION OF EMBODIMENTS

In the water electrolysis method of the present invention, water is electrolyzed by allowing an electric current to flow between both surfaces of an electrolytic membrane including a solid polymer membrane provided with a catalyst layer on a surface thereof, wherein temperature-controlled water is supplied only to a cathode side of the electrolytic membrane, while controlling a difference in pressure between both surfaces of the electrolytic membrane to 50 kPa or less. Further, the water electrolysis device of the present invention has an electrolytic membrane including a solid polymer membrane provided with a catalyst layer on a surface thereof; a housing having spaces defined by the electrolytic membrane; power supply unit for allowing an electric current to flow between both surfaces of the electrolytic membrane; water supply unit for supplying water to a cathode side of the electrolytic membrane; and pressure control unit for controlling a pressure in both spaces in the housing defined by the electrolytic membrane, wherein the water supply unit has a water temperature control device that controls the temperature of water supplied to the cathode side of the electrolytic membrane, and a difference in pressure between both spaces in the housing defined by the electrolytic membrane is made 50 kPa or less by the pressure control unit. The method and device may be implemented in any specific form, provided that the admixture of the generated hydrogen and oxygen is very small and the electrolysis efficiency is high, while the structure is simplified.

Pt/Ir, Pd/Ir, and the like, are generally used as catalysts on the electrolytic membrane surface, but those examples are not limiting.

Further, it is preferred that an organic polymer or inorganic substance with a low gas permeability that is used for reinforcement provided inside the electrolytic membrane be in the form of a film-like reinforcing membrane, and it may be a single solid polymer membrane or a thin film of a ceramic material, or the like, and may have a single-layer or laminated configuration.

EXAMPLES

An embodiment of the water electrolysis method and water electrolysis device in accordance with the present invention will be explained hereinbelow with reference to the drawings.

As depicted in FIG. 1, a water electrolysis device 100 has an electrolytic membrane 102 including a solid polymer membrane provided with a catalyst layer on a surface thereof; a housing 101 having spaces defined by the electrolytic membrane 102; power supply unit 110 for allowing an electric current to flow between both surfaces of the electrolytic membrane 102; and water supply unit 120 for supplying water to a cathode side 103 of the electrolytic membrane.

The water supply unit 120 is configured to circulate water, which is to be electrolyzed, with a pump 121 and to replenish the amount of water reduced by the electrolysis from a water tank 125.

More specifically, water, which is to be electrolyzed, is supplied from the pump 121 to the cathode side of the housing 101 through a check valve 124, this water together with hydrogen generated on the cathode side pass through a heat exchanger 122 constituting a water temperature control device, hydrogen is separated with a gas-water separator 123, and water is then returned to the pump 121 through the check valve 124 and supplied again.

Water that has passed through an ion exchange membrane 126 from the water tank 125 is replenished on the upstream of the pump 121.

The heat exchanger 122 constituting the water temperature control device is configured, for example, such as to perform heat exchange with the air inside the room and also configured to be capable of controlling the temperature of water supplied to the cathode side within a range of room temperature to 100° C. with any well-known unit, for example, by controlling the revolution speed of an air blowing fan.

Hydrogen generated on the cathode side is separated from the circulating water with the gas-water separator 123 and fed through pressure control unit 140, a flowmeter 141, and a hygrometer 142 to a hydrogen tank or hydrogen-using device (not depicted in the figures) according to the intended use.

A pressure applied to the cathode side of the electrolytic membrane 102 in the housing 101 is regulated by the pressure control unit 140 on the hydrogen side.

Meanwhile, oxygen generated on the anode side 104 in the housing 101 is fed through pressure control unit 130, a flowmeter 131, and a hygrometer 132 to an oxygen tank or oxygen-using device (not depicted in the figures) according to the intended use.

A pressure applied to the anode side of the electrolytic membrane 102 in the housing 101 is regulated by the pressure control unit 130 on the oxygen side, and this unit is configured to operate in coordination with the pressure control unit 140 on the hydrogen side, such as to control the difference in pressure between both spaces of the housing 101 defined by the electrolytic membrane 102 to 50 kPa or less.

The effects obtained with the water electrolysis method and water electrolysis device of the present invention which are configured in the above-described manner will be explained hereinbelow.

Figure 2:
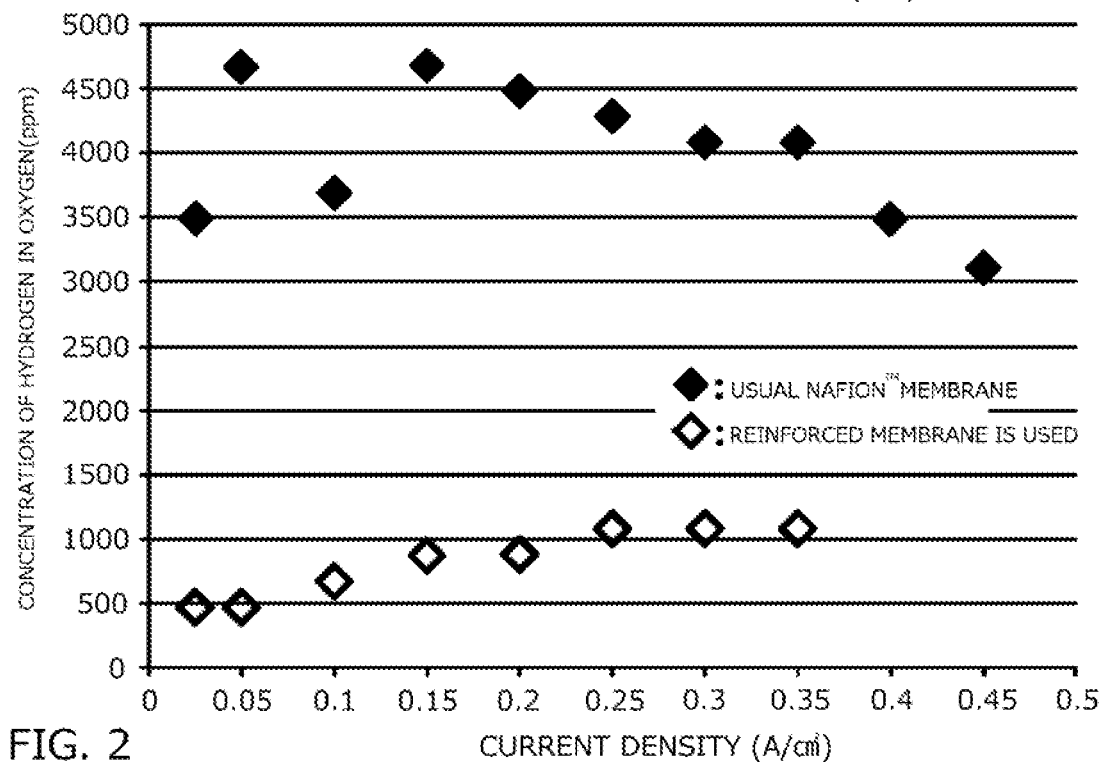
FIG. 2 is a graph representing the amount of hydrogen admixed to the generated oxygen under various conditions.

FIG. 2 shows the amount of hydrogen admixed to oxygen when the temperature of water supplied to the cathode side and the electric current density applied to the electrolytic membrane 102 are changed, while suppressing the difference in pressure between both spaces of the housing 101 defined by the electrolytic membrane 102 to 50 kPa or less.

The water electrolysis device in the form of a three-cell stack was used for electrolysis in which water was supplied at a rate of 680 ml/min to a cathode as a hydrogen-generating electrode, without supplying water to an oxygen-generating electrode. FIG. 2 illustrates an example in which the operation temperature was 30° C.

In FIG. 2, the results obtained with a cation exchange membrane (Nafion 117 (trade name)) which is usually used in water electrolysis are also presented for comparison. In the test illustrated by FIG. 2, the electrolysis was conducted while raising the current density to a maximum of 0.5 A/cm$^2$.

As follows from the figure, when the cation exchange membrane (Nafion 117 (trade name)) was used, the concentration of hydrogen in oxygen of 3500 ppm or higher was continuously detected, whereas when a solid polymer membrane having hydrogen ion conductivity and reinforced with a polytetrafluoroethylene porous film with a thickness of 30 μm was used, only the concentration of hydrogen in oxygen of 1000 ppm or less was detected at all times in the same test, and the effect of using the reinforcing membrane could be confirmed.

A 10 mm (width)×10 cm (length) sample of the membrane used herein was prepared for a tensile strength test, tension was applied to the sample at a crosshead speed of 200 mm/min at 25° C. and a relative humidity of 50% by using a gage length (distance between clamps) of 50 mm, and the maximum load at the time of rupture was recorded. The membrane demonstrated strength of 61 MPa and 56 MPa in the longitudinal direction and transverse direction, respectively. When the same test was performed with respect to Nafion 112 (trade name) having a thickness of 50 μm, the measured tensile strength was 30 MPa and 30 MPa in the longitudinal direction and transverse direction, respectively. Thus, it is clear that the reinforced membrane had an about two-fold strength.

Further, a 5 cm×5 cm sample stored for a minimum of 1 day at 25° C. and a relative humidity of 50% was put for 10 min in deionized water at 100° C. The sample was then taken out placed on a rubber mat, and flat spread. The length in the transverse and longitudinal direction after swelling was measured with a JIS first class scale, and a hydration swelling ratio was determined. The change thereof was 3% in the longitudinal direction and 0% in the transverse direction. When the same test was performed with respect to Nafion 112 (trade name) having a thickness of 50 μm, the hydration swelling ratio was 19% in the longitudinal direction and 16% in the transverse direction. It was thus found that the dimensional variability caused by hydration had a value of 1/5 or less.

INDUSTRIAL APPLICABILITY

With the water electrolysis method and water electrolysis device of the present invention, electrolysis efficiency is increased while ensuring the purity of the generated hydrogen and oxygen. Therefore, the method and device are advantageous for generating hydrogen and oxygen in artificial satellites and space stations where strong constraints are placed on weight, space, and equipment.

Further, the present technique which increases the electrolysis efficiency and facilitates gas separation during water electrolysis can be used not only for hydrogen and oxygen generation, but also for regenerative fuel cells and unitized regenerative fuel cells (reversible fuel cells) that require water electrolysis.

The invention claimed is:

1. A water electrolysis method, comprising:
providing an electrolytic membrane comprising a solid polymer membrane, and a catalyst layer on the solid polymer membrane, the solid polymer membrane being reinforced with a porous film to prevent the electrolytic membrane from damage caused by a difference in pressure between the first surface and the second surface of the electrolytic membrane,
supplying an electric current to the electrolytic membrane, the electric current flowing between a first surface of the electrolytic membrane to a second surface of the electrolytic membrane that is opposite from the first surface, and
supplying temperature-controlled water from a water supply unit to the electrolytic membrane, while controlling the difference in pressure between the first surface and the second surface of the electrolytic membrane to 50 kPa or less,
wherein the first surface of the electrolytic membrane defines a cathode side of the electrolytic membrane,
wherein the second surface of the electrolytic membrane defines an anode side of the electrolytic membrane,
wherein the temperature-controlled water is supplied only to the cathode side of the electrolytic membrane,
wherein an electrolytic solution is not supplied to the anode side of the electrolytic membrane, and an anode side in a housing defined by the electrolytic membrane is dry,
wherein a temperature of the temperature-controlled water in the water supply unit is controlled to be within a range of from room temperature to 60° C.,
wherein the method is configured to manufacture dry oxygen for human respiration, and
wherein the anode side of the electrolytic membrane contains the dry oxygen manufactured by the water electrolysis method.

2. The water electrolysis method according to claim 1, wherein a thickness of the electrolytic membrane is from 5 μm to 200 μm.

3. The water electrolysis method according to claim 1, wherein the electrolytic membrane has a tensile strength of 61 MPa and 56 MPa in a longitudinal direction and transverse direction, respectively, wherein the tensile strength represents a maximum load at the time of rupture.

4. The water electrolysis method according to claim 1, wherein a concentration of hydrogen in the oxygen of the anode side in the housing defined by the electrolytic membrane is 1000 ppm or less.

* * * * *